(12) United States Patent
Addis

(10) Patent No.: US 7,093,835 B2
(45) Date of Patent: Aug. 22, 2006

(54) FLOATING BRUSH SEAL ASSEMBLY

(75) Inventor: Mark E. Addis, Kennebunk, ME (US)

(73) Assignee: United Technologies Corporation, Hartford, CT (US)

(*) Notice: Subject to any disclaimer, the term of this patent is extended or adjusted under 35 U.S.C. 154(b) by 424 days.

(21) Appl. No.: 10/064,889

(22) Filed: Aug. 27, 2002

(65) Prior Publication Data

US 2004/0041348 A1 Mar. 4, 2004

(51) Int. Cl.
*F16J 15/44* (2006.01)

(52) U.S. Cl. .................................. 277/355; 277/422
(58) Field of Classification Search ........... 277/355, 277/422

See application file for complete search history.

(56) References Cited

U.S. PATENT DOCUMENTS

| | | | | |
|---|---|---|---|---|
| 1,085,351 | A | * | 1/1914 | McCandless ............ 277/355 |
| 4,781,388 | A | * | 11/1988 | Wohrl et al. ............ 277/355 |
| 5,114,159 | A | * | 5/1992 | Baird et al. ............ 277/355 |
| 5,400,586 | A | * | 3/1995 | Bagepalli et al. ........ 60/800 |
| 5,474,305 | A | * | 12/1995 | Flower ................. 277/355 |
| 5,480,162 | A | * | 1/1996 | Beeman, Jr. ............ 277/355 |
| 5,927,721 | A | | 7/1999 | Schulze et al. |
| 5,997,004 | A | | 12/1999 | Braun et al. |
| 6,168,162 | B1 | * | 1/2001 | Reluzco et al. .......... 277/355 |
| 6,170,831 | B1 | | 1/2001 | Bouchard |
| 6,226,975 | B1 | | 5/2001 | Ingistov |
| 6,244,599 | B1 | | 6/2001 | Braun et al. |
| 6,308,958 | B1 | | 10/2001 | Turnquist et al. |
| 6,382,632 | B1 | * | 5/2002 | Chupp et al. ............ 277/355 |
| 6,416,057 | B1 | | 7/2002 | Adams et al. |
| 6,428,009 | B1 | | 8/2002 | Justak |
| 6,540,231 | B1 | * | 4/2003 | Trantow et al. .......... 277/355 |
| 6,622,490 | B1 | * | 9/2003 | Ingistov ................ 60/782 |

FOREIGN PATENT DOCUMENTS

WO WO 02/23069 A2 * 3/2002

* cited by examiner

*Primary Examiner*—Alison K. Pickard
(74) *Attorney, Agent, or Firm*—Brian J. Hamilla

(57) ABSTRACT

A brush seal assembly for sealing a gap between a first component and a second component, comprising: a body; bristles extending from the body; and an extension from the body, the extension having an elongated slot therein. The slot, when the brush seal assembly mounts between the first and second components, allows the brush seal assembly to float within the gap. An axial brush seal assembly, comprising: a body; bristles extending from the body; and means for allowing movement of the brush seal assembly in an axial direction within the gap. An apparatus, comprising: a first component; a second component spaced from the first component in an axial direction; and an axial brush seal assembly movably mounted between the first and second components. The brush seal assembly can move in said axial direction.

47 Claims, 3 Drawing Sheets

FLOATING BRUSH SEAL ASSEMBLY

BACKGROUND OF INVENTION

This invention relates to floating brush seal assemblies. Specifically, this invention relates to axial brush seal assemblies that can float in the axial direction within a gap between two components.

Gas turbine engines that exhibit high axial and radial growth transients between adjacent components during operation typically use a labyrinth seal between the components to control leakage. A labyrinth seal comprises a plurality of teeth extending from a disk on one of the components and a honeycomb pad on the other component. The teeth and the pad cooperate to form a serpentine leakage path between the components. The serpentine path inhibits fluid flow between the components.

However, labyrinth seals have several drawbacks. First, the rigid teeth of the labyrinth seal cannot accommodate a "zero clearance" condition without incurring permanent wear or damage to the teeth. This wear increases the leakage rate of the seal. Second, the leakage rate of the labyrinth seals increases with the increased clearance between the teeth and the pad.

SUMMARY OF INVENTION

It is an object of the present invention to provide an improved seal.

It is a further object of the present invention to use a brush seal to control leakage between adjacent components that exhibit high axial and radial growth transients during operation.

It is a further object of the present invention to provide a seal that can accommodate tight "zero clearance" conditions without permanent wear or damage.

It is a further object of the present invention to provide a compliant seal that can accommodate a wide range of clearances.

It is a further object of the present invention to provide a seal that maintains a relatively constant leakage flow rate even as the clearance between the components increases.

These and other objects of the present invention are achieved in one aspect by a brush seal assembly for sealing a gap between a first component and a second component. The assembly comprises: a body; bristles extending from the body; and an extension from the body, the extension having an elongated slot therein. The slot, when the brush seal assembly mounts between the first and second components, allows the brush seal assembly to float within the gap.

These and other objects of the present invention are achieved in another aspect by an axial brush seal assembly for sealing a gap between a first component and a second component. The brush seal assembly comprises: a body; bristles extending from said body; and means for allowing movement of the brush seal assembly in an axial direction within the gap.

These and other objects of the present invention are achieved in another aspect by an apparatus, comprising: a first component; a second component spaced from the first component in an axial direction; and an axial brush seal assembly movably mounted between the first and second components. The brush seal assembly can move in the axial direction.

These and other objects of the present invention are achieved in another aspect by a method of sealing a gap between a first component and a second component. The method comprises the steps of: placing an axial brush seal assembly between the first and second components; and allowing the brush seal assembly to float in the gap.

BRIEF DESCRIPTION OF DRAWINGS

Other uses and advantages of the present invention will become apparent to those skilled in the art upon reference to the specification and the drawings, in which.

DETAILED DESCRIPTION

Figure 1:
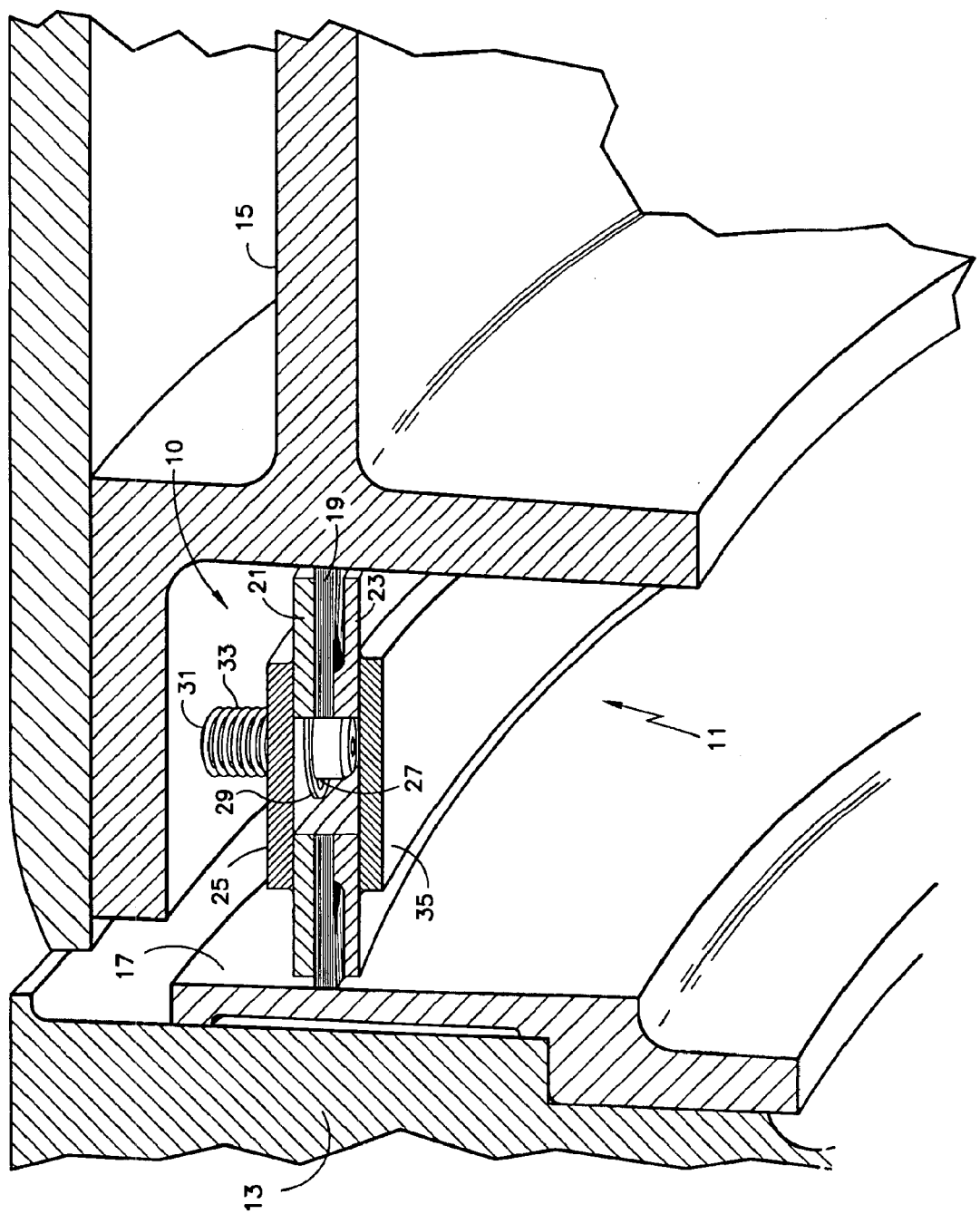
FIG. 1 is a perspective view, in cross-section, of one embodiment of a brush seal assembly of the present invention.

FIG. 1 displays one alternative embodiment of the present invention. The figure provides a brush seal assembly 10 that inhibits fluid flow through a gap 11 between a first component 13 and a second component 15 of an apparatus such as a gas turbine engine. The components 13, 15 could be stationary or rotating components. The figure shows the first component 13 as a rotating component (such as a turbine disc). The component 13 could include a ring 17 that acts as a land surface for the brush seal assembly 10.

The figures also show the second component 15 as a stationary component (such as a turbine nozzle). Since the component 15 remains stationary, no need exists for a ring to provide a land surface like the rotating first component 13 may require. As seen in the figures, multiple elements could form the stationary component 15. Alternatively, both components could be stationary components such as adjacent sections of the engine case, compressor stators and the engine case, or turbine nozzles and the engine case.

During operation of the gas turbine engine, the components 13, 15 exhibit high axial growth transients. In other words, the components 13, 15 move substantially in the axial direction during operation. Although a secondary consideration, the present invention can also accommodate radial growth transients.

The brush seal assembly 10 serves to inhibit flow through the gap 11 between the components 13, 15 despite the growth transients. Generally speaking, the present invention allows movement of the brush seal assembly 10 to ensure an adequate seal despite substantial growth transients. For example, a substantial growth transient could reduce or increase the gap 11 by up to approximately 15% in the axial direction.

Figure 2:
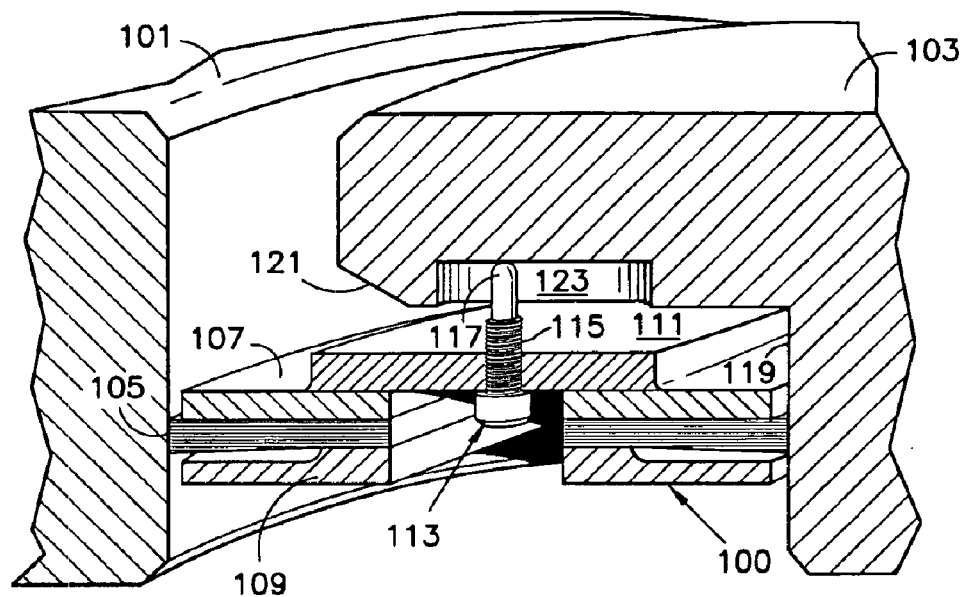
FIG. 2 is a perspective view, in cross-section, of another embodiment of a brush seal assembly of the present invention.

The brush seal assembly 10 is preferably an axial brush seal assembly. The brush seal assembly 10 could use a separate brush seal for each component 13, 15 as seen in FIGS. 1 and 2. Alternatively, the brush seal assembly 10 could be a single brush seal that engages both components 13, 15 such as that shown in FIG. 3. The brush seal preferably has a conventional arrangement, with a bristle pack 19 secured to a backing plate 21 and a side plate 23 such as by welding the metallic pieces together.

An extension 25 bridges between the backing plates 21. The annular extension 25 has a suitable number of circumferentially located slots 27 therein. The slots 27 are elongated in the axial direction of the engine. Preferably, the slots are not elongated in the circumferential direction to prevent rotation of the brush seal. The slots 27 could receive bushings 29 made from, for example, a suitable low friction material.

The second component 15 includes threaded blind holes that correspond to the slots 27 in the extension 25. To secure the brush seal assembly 10 to the second component 15, suitable fasteners, such as set screws 31, extend through the slots 27 in the extension 25 and into the blind holes of the second component 15. The head of the screw 31 is preferably larger than the slot 27.

A spring 33 could surround the shaft of each of the screws 31. The springs 33 help center the brush seal assembly 10 within the engine.

During axial growth transients, the second component 15 can move relative to the first component 13 without affecting the performance of the brush seal assembly 10. The elongation of the slots 27 in the extension 25 allows movement of the screws 31 from the second component 15 therein.

Although a secondary consideration, the second component 15 should also be able to move relative to the first component 13 during radial growth transients without affecting the performance of the brush seal assembly 10. The gap between the extension 25 and the second component 15 allows for such movement. The slots 27 allow the screws 31 to move therein. In essence, the present invention allows the brush seal assembly 10 to float between the components 13, 15.

The present invention self centers within the gap 11. As transients increase, the bristles of the brush seal assembly 10 comply and increase their lay angle. Similarly, as transients decrease, the bristles of the brush seal assembly 10 relax and decrease their lay angle. Throughout this range of bristle movement, the brush seal assembly 10 maintains a relatively constant leakage flow rate through the gap 11 between the components 13, 15.

Since the screw 31 does not occlude the entire slot 27 (the slot 27 being elongated), this arrangement may produce an undesired leakage flow rate. To reduce leakage through the slots 27, the brush seal assembly 10 could include an annular ring 35 that bridges between the side plates 23. The ring 35 could secure to the side plates 23 using any suitable technique such as press-fitting or welding (obviously after the screws 31 have been properly secured in the blind holes). The ring 35 prevents fluid flow through the slots 27. Other alternative techniques, however, could be used. For example, a large washer (not shown) could be placed between the inner diameter of the extension 25 and the head of the screw 31. The washer is sized to occlude the enlarged slots 27 at any position of the screw 31 within the slot 27.

FIG. 2 displays another alternative embodiment of the present invention. The figure displays a brush seal assembly 100 that inhibits fluid flow through a gap between a first component 101 and a second component 103 of an apparatus such as a gas turbine engine. Similar to the aforementioned embodiment, the first component 101 is preferably a rotating component and the second component 103 is preferably a stationary component.

The brush seal assembly 100 includes a bristle pack 105 sandwiched between backing plates 107 and side plates 109. Similar to the aforementioned brush seal assembly 10, the brush seal assembly 100 includes an extension 111 that bridges between the backing plates 107.

Differently than the aforementioned brush seal assembly, the annular extension 111 has a suitable number of threaded holes therein. The holes receive a suitable fastener such as a plunger assembly 113. The plunger assembly 113 includes a set screw 115 with a plunger 117 extending from the distal end. A spring (not shown) within the screw 115 biases the plunger away from the head of the screw 115. The spring within the screw 115 also helps center the brush seal assembly 100 within the engine.

To secure the brush seal assembly 100 to the second component 103, the operator urges the brush seal assembly 100 towards a shoulder 119 of the second component 103. As the brush seal assembly 100 approaches the second component 103, the plunger 117 will eventually abut a chamfer 121 on the second component 103. Continued urging of the brush seal assembly 100 towards the shoulder causes the chamfer 121 to depress the plunger 117. Eventually, the brush seal assembly 100 arrives adjacent the shoulder 119. The plunger 117 will encounter one of a plurality of elongated slots 123 in the second component 103. The spring biases the plunger 117 into the elongated slot 123. The brush seal assembly 100 is now fully secured to the second component 103. To remove the brush seal assembly 100, the plunger assemblies 113 could be unscrewed from the extension 111. Alternatively, the brush seal assembly 100 may be removed from the second component 103 by disengaging the plunger 117 from the slot 123. Conventional techniques to disengage the plunger 117 include providing the proximal end (the end opposite plunger 117) of the plunger assembly 113 with pull levers, knobs or rings (none shown). The operator can actuate these pull levers, knobs or rings to withdraw the plunger 117 from the slot 123.

During axial growth transients, the second component 103 can move relative to the first component 101 without affecting the performance of the brush seal assembly 100. The elongation of the slots 123 in the second component 103 allows movement of the plunger assemblies 113 therein.

Note that the plunger assemblies 113 completely occlude the holes in the extension 111. As a result, no leakage paths exist in the extension 111. Therefore, the brush seal assembly 100 does not require the annular ring 35 used by the aforementioned brush seal assembly 10.

Figure 3:
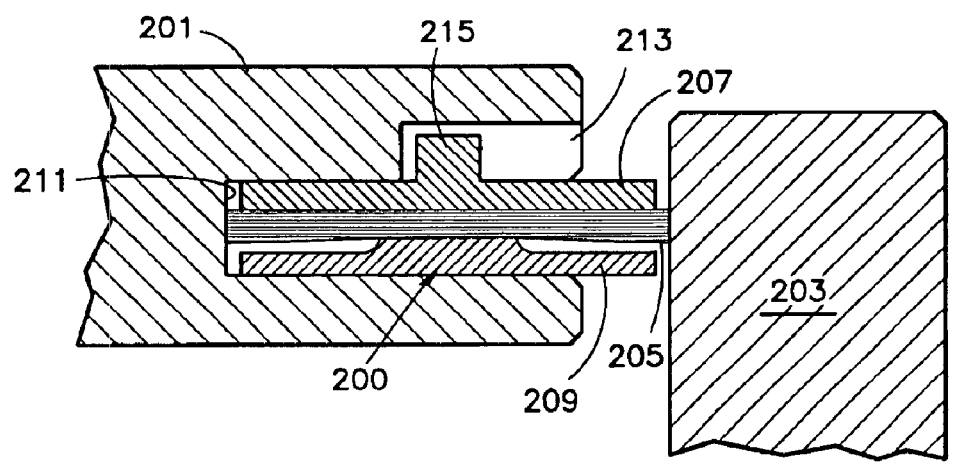
FIG. 3 is a cross-sectional view of another embodiment of a brush seal assembly of the present invention.

FIG. 3 displays another alternative embodiment of the present invention. The figure displays a brush seal assembly 200 that inhibits fluid flow through a gap between a first component 201 and a second component 203 of an apparatus such as a gas turbine engine. Differently than with the earlier embodiments, both components 201, 203 are preferably stationary components.

The brush seal assembly 200 is preferably a single axial brush seal. However, the brush seal assembly 200 could use separate brush seals for each component 201, 203 as seen in FIGS. 1 and 2. The brush seal assembly 200 includes a bristle pack 205 secured to a backing plate 207 and a side plate 209 (with an integral windage cover) such as by welding the metallic pieces together.

The brush seal assembly 200 can reside within an annular slot 211 in the first component 201. Preferably, the slot 211 is sized to allow the brush seal assembly 200 to move axially (i.e. parallel to centerline L of the engine) within the engine to accommodate axial growth transients. In addition, the slot 211 is sized to generally limit radial movement of the brush seal assembly 200 in the engine.

As necessary, the slot 211 could have a plurality of circumferentially spaced keyways 213 in communication therewith. The keyways 213 accept splines 215 radially extending from the backing plate 207. This arrangement prevents the brush seal assembly 200 from rotating.

Figure 4:
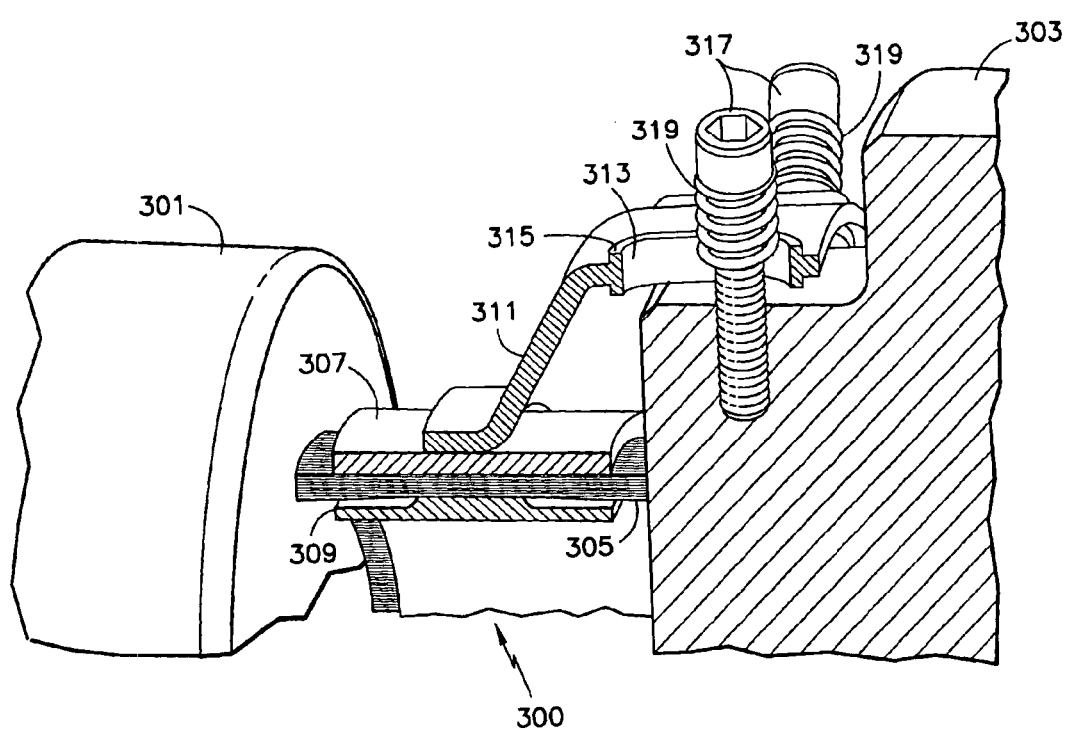
FIG. 4 is a perspective view, in cross-section, of another embodiment of a brush seal assembly of the present invention.

FIG. 4 displays another alternative embodiment of the present invention. The figure shows a brush seal assembly 300 that inhibits fluid flow through a gap between a first component 301 and a second component 303 of an apparatus such as a gas turbine engine. The first component 301 is preferably a rotating component and the second component 303 is preferably a stationary component.

Similar to the aforementioned brush seal assembly 200, the brush seal assembly 300 is preferably a single axial brush seal. The brush seal assembly 300 could, however, use separate brush seals for each component 301, 303. The brush seal assembly 300 includes a bristle pack 305 secured to a backing plate 307 and a side plate 309 (with an integral windage cover) such as by welding the metallic pieces together.

An extension 311 projects from the backing plate 307. The annular extension 311 has a plurality of elongated slots 313 therein. The slots 313 extend in the axial direction of the engine. Preferably, the slots 313 are not elongated in the circumferential direction to prevent rotation of the brush seal. A boss 315 surrounds each slot 313. The boss 315/slot 313 could have a low-friction coating thereon, or a bushing (not shown) made from a low friction material could be placed in the slot 313.

Suitable fasteners, such as set screws 317, extend through the slots 313 to mount the brush seal assembly 300 to the second component 303. A coil spring 319 surrounds the fastener 317. The spring 319 serves to bias the extension 311 away from the head of the fastener 317 and towards the second component 303.

The fastener 317 sufficiently compresses the spring 319 to urge the extension 311 against the second component 303. However, the spring 319 should also permit movement of the second component 303 relative to the brush seal assembly 300 by allowing the fastener 317 to move with the elongated slot 313. The spring rates of the bristles of the bristle pack 305 keep the brush seal assembly 300 centered within the gap between the components 301, 303. This centering capability also allows the fasteners 317 will move within the slots 313.

This arrangement allows movement of the second component 303 relative to the first component 301 without affecting the performance of the brush seal assembly 300. The elongation of the slots 313 in the extension 311 allows movement of the fasteners 317 therein. In other words, the present invention allows the brush seal assembly 300 to float between the components 301, 303 in the axial direction.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A brush seal assembly for sealing a gap between a first component and a second component, comprising:
    a body;
    bristles secured to and extending from said body in a direction; and
    an extension from said body, said extension having a slot therein with a depth, said slot being elongated transverse to said depth;
    wherein said slot, when said brush seal assembly mounts between said first and second component, allows said brush seal assembly to float within said gap along said direction.

2. The brush seal of claim 1, wherein said brush seal assembly can axially float within said gap.

3. The brush seal of claim 1, wherein said brush seal is an axial brush seal.

4. The brush seal of claim 1, further comprising a spring for biasing said brush seal.

5. The brush seal of claim 4, wherein said spring biases said brush seal against said second component.

6. The brush seal of claim 4, wherein said spring biases said brush seal away from said second component.

7. The brush seal assembly of claim 1, wherein said elongated slot has a depth, and said slot is elongated transverse to said depth.

8. The brush seal assembly of claim 1, wherein said bristles engage said first and second components.

9. The brush seal assembly of claim 8, wherein said brush seal assembly includes a first brush seal for engaging said first component and a second brush seal for engaging said second component.

10. The brush seal assembly of claim 8, wherein a single brush seal engages said first and second components.

11. An axial brush seal assembly for sealing a gap between a first component and a second component having an elongated slot and keyways in communication therewith, comprising:
    a body positionable in said elongated slot so that said brush seal assembly can move in an axial direction within said gap;
    bristles extending from said body and engaging said first and second components; and
    splines extending from said body and positionable within said keyways to prevent rotation of said brush seal assembly.

12. The axial brush seal assembly of claim 11, wherein said splines radially extend from said body.

13. The axial brush seal assembly of claim 11, wherein said brush seal assembly includes a first brush seal for engaging said first component and a second brush seal for engaging said second component.

14. The axial brush seal assembly of claim 11, wherein a single brush seal engages said first and second components.

15. An axial brush seal assembly for sealing a gap between a first component and a second component, comprising:
    a body;
    bristles secured to and extending from said body, wherein said bristles engage said first and second components; and
    an extension from said body, said extension having a first section extending radially from said body, a second section extending axially from said first section, and a slot in said second section that is elongated in said axial direction for allowing movement of said brush seal assembly in an axial direction within said gap.

16. The axial brush seal assembly of claim 15, further comprising a spring for biasing said brush seal.

17. The axial brush seal of claim 16, wherein said spring biases said brush seal assembly against said second component.

18. The brush seal of claim 16, wherein said spring biases said brush seal assembly away from said second component.

19. The axial brush seal assembly of claim 15, wherein said elongated slot has a depth, and said slot is elongated transverse to said depth.

20. The brush seal assembly of claim 15, wherein said brush seal assembly includes a first brush seal for engaging said first component and a second brush seal for engaging said second component.

21. The brush seal assembly of claim 15, wherein a single brush seal engages said first and second components.

22. The axial brush seal assembly of claim 15, further comprising a boss surrounding said slot.

23. An apparatus, comprising:
 a first component;
 a second component spaced from said first component in an axial direction;
 an axial brush seal assembly movably mounted between said first and second components and having bristles engaging said first and second components; and
 a spring;
 wherein said brush seal assembly can move in said axial direction and said spring biases said brush seal assembly.

24. The apparatus of claim 23, wherein said apparatus is a gas turbine engine.

25. The apparatus of claim 23, wherein said spring biases said brush seal assembly against said second component.

26. The apparatus of claim 23, wherein said spring biases said brush seal assembly away from said second component.

27. The apparatus of claim 23, wherein said brush seal assembly includes a first brush seal for engaging said first component and a second brush seal for engaging said second component.

28. The apparatus of claim 23, wherein a single brush seal engages said first and second components.

29. A method of sealing a gap between a first component and a second component, comprising the steps of:
 placing an axial brush seal assembly between said first and second components, said axial brush seal assembly having bristles that engage said first and second components;
 allowing said brush seal assembly to float in said gap; and
 preventing rotation of said brush seal assembly.

30. The method of claim 29, wherein said allowing step comprises allowing said brush seal to float axially in said gap.

31. The method of claim 29, wherein said allowing step includes a step of applying a bias force to said brush seal.

32. The method of claim 31, wherein said applying step comprises applying a spring bias force to said brush seal.

33. The method of claim 29, wherein said brush seal assembly includes a first brush seal for engaging said first component and a second brush seal for engaging said second component.

34. The method of claim 29, wherein a single brush seal engages said first and second components.

35. An axial brush seal assembly for sealing a gap between a first component and a second component having an elongated slot therein that is closed at its ends, comprising:
 a body;
 bristles extending from said body; and
 a fastener rigidly mounted to said body and adapted to move during installation to avoid one of said closed ends of said elongated slot and to extend into said elongated slot after installation;
 wherein said fastener can travel within said elongated slot to allow movement of said brush seal assembly within said gap.

36. The axial brush seal assembly of claim 35, wherein said fastener is removable.

37. The axial brush seal assembly of claim 35, wherein said fastener comprises a plunger assembly.

38. The axial brush seal assembly of claim 35, wherein said bristles engage said first and second components.

39. The axial brush seal assembly of claim 38, wherein said brush seal assembly includes a first brush seal for engaging said first component and a second brush seal for engaging said second component.

40. The axial brush seal assembly of claim 38, wherein a single brush seal engages said first and second components.

41. A method of sealing a gap between a first component and a second component, comprising the steps of:
 placing an axial brush seal assembly between said first and second components, said axial brush seal assembly having a body, bristles extending from said body, and an extension from said body, said extension having a slot therein with a depth, said slot being elongated transverse to said depth;
 allowing said brush seat assembly to float in said gap; and
 applying a bias force to said brush seal assembly.

42. The method of claim 41, wherein said applying step comprises applying a spring bias force to said brush seal assembly.

43. The method of claim 41, wherein said applying step biases said brush seal assembly against said second component.

44. The method of claim 41, wherein said applying step biases said brush seal assembly away from said second component.

45. The method of claim 41, further comprising a step of engaging said first and second components with said bristles.

46. The method of claim 45, wherein said brush seal assembly includes a first brush seal for engaging said first component and a second brush seal for engaging said second component.

47. The method of claim 45, wherein a single brush seal engages said first and second components.

* * * * *